(12) United States Patent
Komatsu et al.

(10) Patent No.: US 8,012,524 B2
(45) Date of Patent: Sep. 6, 2011

(54) MOUSSE-TYPE SPREAD AND MOUSSE-TYPE EDIBLE OIL

(75) Inventors: Yoshinori Komatsu, Odawara (JP); Shigeru Tamai, Odawara (JP)

(73) Assignee: Meiji Dairies Corporation, Tokyo (JP)

( * ) Notice: Subject to any disclaimer, the term of this patent is extended or adjusted under 35 U.S.C. 154(b) by 668 days.

(21) Appl. No.: 10/539,445

(22) PCT Filed: Dec. 19, 2003

(86) PCT No.: PCT/JP03/16337
§ 371 (c)(1),
(2), (4) Date: Jun. 20, 2005

(87) PCT Pub. No.: WO2004/056190
PCT Pub. Date: Jul. 8, 2004

(65) Prior Publication Data
US 2006/0078659 A1 Apr. 13, 2006

(30) Foreign Application Priority Data

Dec. 20, 2002 (JP) .................................. 2002-371030
Jul. 18, 2003 (JP) ................................. 2003-276717

(51) Int. Cl.
*A23B 4/16* (2006.01)
(52) U.S. Cl. .......... 426/601; 222/192; 222/394; 424/43; 426/312; 426/531; 426/564
(58) Field of Classification Search .................. 426/601, 426/531, 564, 312; 424/43; 222/394, 192
See application file for complete search history.

(56) References Cited

U.S. PATENT DOCUMENTS

| 3,849,580 | A | * | 11/1974 | Sejpal et al. | ................... | 426/116 |
| 3,896,975 | A | * | 7/1975 | Follmer | ........................ | 222/192 |
| 4,780,309 | A | | 10/1988 | Geria et al. | | |
| 4,874,626 | A | * | 10/1989 | Castenmiller et al. | ........ | 426/564 |
| 5,156,876 | A | * | 10/1992 | Clapp et al. | ................... | 426/609 |
| 5,773,073 | A | * | 6/1998 | Matsuda et al. | .............. | 800/300 |
| 6,683,117 | B2 | | 1/2004 | Komatsu et al. | | |
| 2002/0176832 | A1 | | 11/2002 | Lanzendorfer et al. | | |
| 2002/0182303 | A1 | * | 12/2002 | Hotta et al. | ................... | 426/602 |
| 2003/0019888 | A1 | * | 1/2003 | Gupta | ........................... | 222/389 |

FOREIGN PATENT DOCUMENTS

| EP | 0 285 198 | | 10/1988 |
| JP | 59-183650 | A | 10/1984 |
| JP | 61-192274 | A | 8/1986 |
| JP | 63-012257 | A | 1/1988 |
| JP | 64-086833 | A | 3/1989 |
| JP | 04-030748 | A | 2/1992 |
| JP | 05-132010 | A | 5/1993 |
| JP | 2001-178364 | A | 7/2001 |
| JP | 2002-212025 | A | 7/2002 |
| JP | 2002-302550 | A | 10/2002 |

OTHER PUBLICATIONS

Montfort A. Johnsen, "Food Aerosols. Part II", Spray Technology & Marketing, vol. 11, No. 2, Feb. 2001, pp. 32, 34, and 36-41.
Japanese Office Action dated Sep. 8, 2008.

* cited by examiner

*Primary Examiner* — Brent T O'Hern
(74) *Attorney, Agent, or Firm* — Sughrue Mion, PLLC

(57) ABSTRACT

The present invention aims at providing novel spread and edible oil having excellent characteristics as a spread or an edible oil. An edible oil and a suitable emulsifier, in a water-in-oil type emulsion is filled with a suitable gas propellant into an aerosol container, and the emulsion is discharged as mousse form at the time of jetting.

2 Claims, No Drawings

MOUSSE-TYPE SPREAD AND MOUSSE-TYPE EDIBLE OIL

TECHNICAL FIELD

The present invention relates to a mousse-type spread and a mousse-type edible oil, which comprises an edible oil and an emulsifier or a composition made into water-in-oil type emulsion in use, which are filled with a gas propellant into an aerosol container, wherein the content is foamed to be in a mousse form at the time of jetting.

BACKGROUND ART

Foods having improved storage stability and convenience by utilizing aerosol container have already been known. Such foods are roughly classified into two, i.e. emulsions comprising fat and oil, water, an emulsifier sealed in an aerosol container, and only an edible oil sealed in an aerosol container.

The former emulsions are further classified into those in the form of an oil-in-water type emulsion, and those in the form of a water-in-oil type emulsion. In addition, almost all of the former emulsions are applied to foods in the form of an oil-in-water type emulsion in an aerosol container, and used for creams, such as whip creams and ice creams, which are usually in a foaming state, and the discharged food is also in the form of cream. Further, in JP-A-4-148662, a dressing has been reported as an example of the oil-in-water type emulsion which is normally in the form of a liquid, and which is made into the form of a mousse form after the jetting. However, there are few examples in which the water-in-oil type emulsion used as a spread and the like or a composition which is a water-in-oil type emulsion in use are processed as foods sealed in an aerosol container. Especially, no example of a water-in-oil type emulsion discharged in the mousse form has been reported yet.

The latter, the edible oil sealed in an aerosol container, is used mainly for the cooking purpose, and designed to be sprayed in the form of a mist for the convenience of the cooking operation. Therefore, the composition of the edible oil used is adjusted to be a composition permitting the oil to have a high fluidity and lightness on the assumption that the oil is sprayed in the form of a mist. Although alcohols are used for the purpose of obtaining such an edible oil, a problem of the inflammability is caused. Therefore, for example, an edible oil to which diglyceride and medium-chain triglyceride are added in order to reduce the viscosity of the oil without using alcohols, and to permit the oil to be sprayed uniformly in the form of a mist has been reported in JP-A-2001-178364. However, since the edible oil itself is inflammable, it is considered to be difficult to eliminate the problem of the inflammability, even though the convenience is excellent in terms of a cooking operation when sprayed in the form of a mist. In the meantime, a flavored oil sealed in an aerosol container, which is used also for the seasoning purpose has been proposed in JP-A-Hei4-30748. In this case, it is speculated that the flavored oil is also sprayed in the form of a mist, according to the description that the flavored oil is prepared so that the oil can be sprayed. When the edible oil or flavored oil sprayed in the form of a mist is used for the seasoning purpose, especially in the same manner as a spread, it is considered to be difficult to discharge the oil accurately with controlling the quantity or the predetermined part with respect to the object. For example, it is difficult to spray these oils onto only a predetermined part of a three-dimensional object, such as bread roll, and the edible oil flows after they are sprayed. Therefore, a lack of plasticity, which should be provided in a spread, can be pointed out. Briefly, it is preferable that the spread has a suitable plasticity and an easiness of application thereof to a food, and that the applied conditions are maintained. Therefore, when the foods in the form of a water-in-oil type emulsion which are usually used as spread are made into foods sealed in aerosol containers, it is problematic for use as spreads, since the foods do not have plasticity when sprayed in the form of a mist, which is the same as the above-mentioned edible oil. At the same time, the mouth-feel is same as that of licking a salad oil or a flavored oil directly. Thus, the properties as foods are considered to be problematic. Due to these problems, it is considered that there are few examples of foods, in which a water-in-oil emulsion is sealed in an aerosol container. An example in which a coffee oil to which an emulsifier is added is sealed in an aerosol container has been reported in JP-A-64-086833, as a rare example in which a water-in-oil type emulsion or an edible oil to which an emulsifier is added is sealed in an aerosol container in the same manner as in the structure according to the present invention. However, in that case, increasing the aroma of the coffee is the object of the invention, and the design is made so that the coffee oil scatters in the air when sprayed to permit the aroma of the coffee to be diffused to the environment. In addition, the emulsifier is added for the purpose of preventing an oil film of the sprayed coffee oil from being formed on a liquid level of the coffee, and not for the purpose of discharging the coffee oil in the mousse form.

As described above, these sealed emulsions have been conventionally designed to be sprayed in the form of a mist when the edible oils or the water-in-oil type emulsions are made into an aerosol container-sealed foods. Therefore, it was difficult to be applied to a predetermined part of the foods in an accurately controlled quantity, or little by little in a controlled manner to a wide range of the surface of the foods, when they were used for the same purpose as the spreads. Furthermore, even when the aerosol container-sealed edible oil is used for the cooking purpose, there has been a problem, e.g. the oil is in danger of igniting on an iron plate which is directly heated.

DISCLOSURE OF THE INVENTION

The inventors of the present invention made various investigations in order to solve these problems, and found that, when materials originally in the form of a water-in-oil type emulsion, such as butter and margarine, materials in the form of a water-in-oil type emulsion obtained by emulsifying an oil, such as a butter oil and a water component with a suitable emulsifier, or materials in the form of a composition capable of forming a water-in-oil type emulsion in a container are sealed in an aerosol container together with a suitable gas propellant, subjected to a mixing before jetting, and then jetted, they are discharged in the form of a stable mousse and not in the form of a mist at the time of jetting. It was also found that, when an edible oil is mixed with a suitable emulsifier without using water and the resultant mixture is jetted from an aerosol container in the same manner as the above-mentioned emulsion, this mixture is also discharged in the form of a mousse. In addition, it was found that the mousse-type foods have excellent properties as spreads, since the quantity thereof applied to a food can be controlled easily to a suitable level, plasticity is moderate and mouth-feel is good, when these mousse-type foods are used as spreads. It was further found that these mousse-type spreads and mousse-type edible oils can be used as foods with a high safety for cooking in comparison with the conventional aerosol container-sealed foods sprayed in the form of a mist.

Namely, the present invention provides novel and useful mousse-type spreads and mousse-type edible oils used as excellent spreads and edible oils, which comprises an edible oil and an emulsifier or a compound which is made into a water-in-oil type emulsion in use, which are sealed with a suitable gas propellant into an aerosol container, is subjected to mixing before jetting, and is not discharged in the form of a mist but is formed to be in a stable mousse form after jetting.

BEST MODE FOR CARRYING OUT THE INVENTION

The composition used in the present invention and made into a water-in-oil type emulsion in use means a water-in-oil type emulsion prepared from an oil, a water phase and an emulsifier, a composition comprising an oil, a water phase and an emulsifier, which is capable of forming a water-in-oil type emulsion by a simple mixing operation and the like, or an originally water-in-oil type emulsion, such as butter. It is necessary that the above-mentioned composition or edible oil which is used in the present invention has a fluidity at least in use, and that the gas propellant be dissolved to such an extent that the foaming occurs at the time of jetting.

The fluidity means that it is possible to discharge the composition from a nozzle, and does not mean that the composition is necessarily in the liquid condition. For example, even a gel composition can be discharged in a mousse form by choosing a certain kind of gas propellant and a certain level of filling pressure.

As the fats and oils according to the present invention, which are used for the composition made into a water-in-oil emulsion by combining with emulsifier, vegetable fats and oils, such as canola oil, soy bean oil, corn oil, coconut oil, palm oil, palm kernel oil, cacao oil, peanut oil, butter oil; animal fats and oils, such as milk fat, beef tallow, lard, fish oil; mixed oil of these oils, and a processed oil of these oils; and diacylglycerol can be used. The edible oils used in the present invention have a cloud point of about 4.4° C. (40° F.) or lower as listed in, for example, Bailey's Industrial Oil and Fat Products, Ed. Daniel Swern (1982). Especially, it is possible to add a preferable flavor to the foods by using milk fat, such as butter oil, is used solely or in combination with other oil. In addition, butter and the like containing a large quantity of milk fat may be used by combining with other oil.

The edible oils according to the present invention are edible oils without adding any water, and so-called salad oils, such as corn oil and safflower oil, can be mentioned as examples. These salad oils may be oils, such as garlic oil, green onion oil, hot sesame oil and herb oil, in which spice component is dissolved. Further, seasoning components, such as an edible salt may be optionally disperse-added by a homomixer and the like, and an edible die, a spice and the like may also be added. It is also possible to use edible oils, such as olive oil and sesame, oil solely, which originally have the peculiar flavor. In order to add an emulsifying agent to these edible oils, the edible oils are heated, for example, to about 70° C. and the emulsifier may then be disperse-added thereto.

The emulsifier used in the present invention has a HLB value of 7.0 or less, and preferably 5.0 or less. Specifically, sucrose fatty acid ester, glycerin fatty acid ester, sorbitan fatty acid ester, polysorbate, enzyme processed lecithin, etc. are used solely or in combination. Among these, glycerin fatty acid ester can be preferably used in the present invention, due to the excellent shape of foam and a high stability of foam after foaming. It is also possible to add an emulsifier used for some other purpose, in addition to the emulsifier used for discharging the edible oil in the mousse form. For example, lecithin and the like as a mold release agent can be further added in addition to the glycerin fatty acid ester used in the present method.

The amount of the emulsifier added is, for example, 0.1% to 10%, preferably 0.5% to 6%, and more preferably 0.7% to 4%, when glycerin fatty acid ester is solely used. When the glycerin fatty acid ester is used in combination with some other emulsifier, the amount to be added may be suitably increased or decreased on the basis of the above-mentioned amount to be added solely. For example, when the concentration of the emulsifier is near the lower limit, the stability of the foam is deteriorated, and, when the concentration of the emulsifier is near the upper limit, the taste of the product is adversely affected, and the manufacturing cost is increased. Therefore, the concentration of the emulsifier to be used may be determined with regard to these points and the like.

Foods which are originally a water-in-oil type emulsion, such as butter, can be used in the present invention without adding an emulsifier. In addition, it is possible to use a food other than the emulsifier, for example, oils and fats, water, seasoning materials and the like by mixing with butter and the like. Furthermore, an emulsifier can also be added to these foods for use.

The gas propellants used in the present invention include nitrous oxide, carbon dioxide, nitrogen, LPG, LNG and the like. These gas propellants can be used solely or in combination. However, in order to use these gas propellants, it is necessary to select the kind of gas depending on the food to be applied or the use thereof, and to change the setting of the filling pressure, with taking the nature thereof into consideration. For example, inflammable gas, such as nitrous oxide or nitrogen, is preferably selected as the gas propellants used for the edible oils. In the case of gas with the high solubility with respect to both the water and oil, such as nitrous gas, foams in the mousse form can be obtained even when the filling pressure is around 300 kPa at 25° C., which is comparatively low. However, when nitrogen, which has a lower solubility than that of the nitrous oxide and the like, is used, a filling pressure of around 800 kPa is necessary.

Further, when carbon dioxide is selected, it should be taken into account that acid taste is added to the food after jetting.

These gas propellants can also be used in an interpolating manner with each other. For example, when a mixture obtained by mixing 1 part by volume of nitrogen with 1 part by volume of nitrous oxide is used, the degree of foaming can be controlled to a lower level than that in the case of using nitrous oxide solely. The use of such a mixture can be applied to a case where it is necessary to produce the mousse which is more stable and fine in texture.

The filling operation into an aerosol container is carried out by inserting required quantities of edible oil, emulsifier, water-in-oil type emulsion and the like in a stainless pressure resisting container, introducing a filling gas into the same container, and maintaining a required gas pressure. A filling nozzle provided at a lower portion of the container and a nozzle of the aerosol container are connected together, and valves of the two nozzles are opened at the same time to cause the content of the pressure resisting container and filling gas to be filled into the aerosol container. When two or more kinds of gases are filled, gases mixed with each other at a predetermined ratio in advance are used, or it is also possible to fill the gases sequentially. In addition, it is also possible to conduct the filling of the content and gas separately. Further, it is also possible to introduce the contents into the container before the nozzle for the aerosol container is fixed thereto, followed by filling the aerosol container with the gas via the nozzle after fixing the nozzle.

As the aerosol container and the nozzle in the present invention, a metal container such as a steel can and an aluminum can, which are used for existing aerosol food such as whip cream, and a nozzle fixed to these containers can be used as they are. A plastic container can also be included in such containers as long as the plastic container can resists a high pressure.

Concerning the points to notice with respect to a gas pressure, a container to be used, thermal sterilization and the like in the production of these aerosol container-sealed foods, it is possible to refer to the description, for example, of "Production Method of Foods Sealed in Aerosol Can" (JP-B-6-2041).

With regard to the storage of foods, the edible oil, a water-in-oil type emulsion or a composition turning into a water-in-oil type emulsion may be kept separately from the aerosol container. In this case, it is possible to employ a mode in which the food and the gas propellant are mixed with each other in a vender type aerosol container having a mechanism for mixing the food and the gas propellant with each other, at the time of the supplying of the food, and the resultant mixture is discharged as a mousse-type spread or a mousse-type edible oil immediately after mixing.

The mousse-type spread and mousse-type edible oil according to the present invention, which are obtained as described above, are novel mousse-type spread and edible oil which have excellent convenience and safety, and excellent properties as a spread type food and an edible oil in comparison with the aerosol container-sealed food sprayed in the form of a mist. Further, the mousse-type spread and mousse-type edible oil according to the present invention have new mouth-feel and flavor which are not encountered in the conventional spread and edible oil.

Hereinafter, the present invention is described in detail by illustrating Examples and Test Examples.

EXAMPLE 1

(Water-in-Oil Type Emulsion) Example Using a Nitrogen Gas

A raw liquid was prepared by mixing raw materials at the following compounding ratio. A canola oil was heated to 70° C., and monoglycerin fatty acid ester was added to and dissolved in the heated canola oil. The water was added to the oil while the oil was agitated in a homomixer (Polytron PT-3100 manufactured by CENTRAL KAGAKU CORP.) rotated at 4,000 rpm, and water droplets were dispersed into the oil to prepare a water-in-oil type emulsion. Into a nozzle-carrying pressure resisting container (250 ml), 100 g of emulsion out of the emulsion thus prepared was filled with a nitrogen gas at a filling pressure of 800 kPa (25° C.).

| | |
|---|---|
| Canola oil | 87.7 parts |
| Monoglycerin fatty acid ester | 1.3 parts |
| Water | 11.0 parts |

After being filled, the emulsion was kept at room temperature or refrigerating temperature. When the emulsion was used, the container was shaken 3 to 5 times, and the emulsion was discharged from the nozzle. As a result, the emulsion was extended with foaming, to be made into a mousse-type food. The mousse-type food showed the nature preferable to be used as a spread applied in a suitable quantity to the surface of bread, and having a suitable shape retaining property.

EXAMPLE 2

(Water-in-Oil Emulsion) Example Using a Nitrous Oxide Gas

A raw liquid was prepared by mixing raw materials at the following compounding ratio in the same manner as in Example 1. Into a nozzle-carrying pressure resisting container (90 ml), 50 g of the raw liquid was filled with a nitrous oxide gas at a filling pressure of 500 kPa (25° C.).

| | |
|---|---|
| Corn oil | 90.0 parts |
| Diglycerin fatty acid ester | 2.8 parts |
| Water | 7.2 parts |

After being filled, the emulsion was kept at room temperature or refrigerating temperature. When the emulsion was used, the container was shaken 3 to 5 times, and the emulsion was discharged from the nozzle. As a result, the emulsion was extended with foaming, to be made into a mousse-type food. The mousse-type food showed the nature preferable to be used as a spread applied in a suitable quantity to the surface of bread, and having a suitable shape retaining property.

EXAMPLE 3

(Water-in-Oil Type Emulsion) Example Using a Mixed Gas

Water was heated to 40° C., and an edible salt and whey powder were disperse-dissolved therein to prepare a water phase. A refined soy oil was heated to 70° C., and monoglycerin fatty acid ester was added to and dissolved in the resultant oil. The water phase was added to the oil while the oil was agitated with a homomixer (Polytron PT-3100 manufactured by the Central Science Co., Ltd.) rotated at 4,000 rpm to prepare a water-in-oil type emulsion. A gas obtained by mixing 3 parts by volume of carbon dioxide gas and 7 parts by volume of nitrogen gas together was filled with 80 g of the prepared liquid into a nozzle-carrying pressure resisting container (250 ml) at a filling pressure of 500 kPa (25° C.).

| | |
|---|---|
| Refined soy oil | 94.7 parts |
| Monoglycerin fatty acid ester | 1.4 parts |
| Whey powder | 0.3 parts |
| Edible salt | 0.67 parts |
| Water | 2.63 parts |
| Spice | 0.3 parts |

After being filled, the emulsion was kept at room temperature or refrigerating temperature. When the emulsion was used, the container was shaken 3 to 5 times, and the emulsion was discharged from the nozzle. As a result, the emulsion was extended with foaming, to be made into a mousse-type food finer than the mousse-type food obtained when a carbon oxide gas was used solely at the emulsion filling time. Moreover, this mousse-type food had an acidity-lowered flavor in comparison with that obtained with carbon dioxide used solely during an emulsion filling operation, and did not have a problem as a spread.

TEST EXAMPLE 1

(Water-in-Oil Type Emulsion) Ascertainment of the Physical Property of a Refrigeration Preserved Emulsion Water was heated to 40° C., and an edible salt and skim milk powder were disperse-dissolved therein to prepare a water phase. A canola oil and a butter oil were mixed with each other, and the mixture was heated to 70° C. Lecithin and monoglycerin fatty acid ester were added to and dissolved in the mixture. The water phase was added to the oil while the oil was agitated with a homomixer (Polytron PT-3100 manufactured by CENTRAL KAGAKU CORP.) rotated at 4,000 rpm, to prepare a water-in-oil type emulsion. A spice and carotene were added to the emulsion, and the mixture was thermally sterilized at 95° C. for 1 minute. The liquid thus prepared was cooled to 25° C. Into a nozzle-carrying pressure resisting container (250 ml), 100 g of the prepared liquid was filled with nitrous oxide at a filling pressure of 500 kPa (25° C.)

| Canola oil | 46.0 parts |
| Butter oil (melting point of 15° C.) | 25.0 parts |
| Lecithin | 0.2 parts |
| Monoglycerin fatty acid ester | 1.3 parts |
| Spice | 0.9 parts |
| β carotene (30%) | 0.0008 parts |
| Edible salt | 1.1 parts |
| Skim milk powder | 0.8 parts |
| Water | 24.7 parts |

After being filled, the emulsion was kept at room temperature or 5° C. When the emulsion was used, the container was shaken 3 to 5 times, and the emulsion was discharged from the nozzle. As a result, the emulsion was extended with foaming, to be made into a mousse-type food. The mousse-type food showed the nature preferable to be used as a spread applied in a suitable quantity to the surface of bread, and having a suitable shape retaining property.

After one month from the time of refrigeration, the content of the container was discharged after shaking the container. The property of the sprayed material was unchanged and kept preferable to be used as a spread.

EXAMPLE 4

(Water-in-Oil Type Emulsion) Example Applied to a Vender

Into a stainless steel pressure resisting sealed container (40 mm in diameter×200 mm in length) provided with a valve at a bottom portion thereof, 100 g of water-in-oil type emulsion prepared in the same manner as in Test Example 1 was inserted, and nitrous oxide was introduced from a hole provided in an upper portion of the container thereinto. The valve in the bottom portion was opened with a gas pressure of 500 kPa (25° C.) maintained. The content was taken out through a stainlelss pipe (8 mm in diameter×150 mm in length) and a vinyl tube (8 mm in diameter×200 mm in length). The content was extended with foaming, and made into an excellent mousse-type food, which showed nature preferable to be used as a spread.

EXAMPLE 5

(Water-in-Oil Type Emulsion) Example in which a Raw Mixture was Filled into a Container Without Carrying Out an Emulsification Process An edible salt was dissolved in the water of normal temperature to prepare a water phase. A canola oil was heated to 70° C., and monoglycerin fatty acid ester and polyglycerin fatty acid ester were added to and dissolved in the water phase, followed by cooling to 25° C. Into a nozzle-carrying transparent PET container (90 ml), 42.5 g of the oil thus prepared was filled with nitrous oxide at a filling pressure of 200 kPa (25° C.), and then 7.5 g of water phase with nitrous oxide at a filling pressure of 500 kPa (25° C.).

| Canola oil | 83.7 parts |
| Monoglycerin fatty acid ester | 0.9 parts |
| Polyglycerin fatty acid ester | 0.4 parts |
| Edible salt | 0.1 parts |
| Water | 14.9 parts |

The container was shaken around 20 times to ascertain by visual observation that the water phase was cloudily dispersed into the oil phase to be turned into a state of a water-in-oil type emulsion. When the content of the container was discharged from the nozzle, it foamed in an excellent mousse form. A part of this discharged product was picked up and was observed by an optical microscope to ascertain that the product was in a state of emulsion in which a water phase was dispersed into an oil phase.

EXAMPLE 6

(Water-in-Oil Type Emulsion) Example Using Butter Solely

After 100 g of salt-containing butter heated to 28° C. was inserted in the same stainless steel pressure resisting sealed container (40 mm in diameter×200 m in length) as was used in Example 5, nitrous oxide was introduced from a hole provided at an upper portion of the container thereinto. A valve at a bottom portion of the container was opened with a gas pressure of 1 MPa (28° C.) maintained, and the content was taken out through a stainless steel pipe (8 mm in diameter×150 mm in length) and a vinyl tube (8 mm in diameter× 200 mm in length). The butter was extended with foaming, and showed an excellent mousse form. The mouth-feel of the food was a light mouth-feel like that of a fat spread, and the flavor was that of butter itself. It could be said that the food of this Example was a novel food and was different from the conventional butter.

EXAMPLE 7

(Edible Oil) Example Using Diglycerin Fatty Acid Ester as an Emulsifier

A canola oil was heated to 70° C., and diglycerin fatty acid ester was added to and dissolved in this oil at the following compounding ratio. Into a nozzle-carrying pressure resisting container (250 ml), 100 g of the oil was filled with nitrogen gas at a filling pressure of 900 kPa (25° C.)

| | |
|---|---|
| Canola oil | 97.0 parts |
| Diglycerin fatty acid ester | 3.0 parts |

After being filled, it was kept at room temperature and the container was then shaken 3 to 5 times. When the content of the container was then discharged from the nozzle, the content was extended with foaming, to be made into a mousse-type food having suitable form-maintaining characteristics as well as mouth-feel of such a food.

EXAMPLE 8

(Edible Oil) Example Using Monoglycerin Fatty Acid Ester as an Emulsifier

A garlic oil was heated to 70° C., and monoglycerin fatty acid ester was added to and dissolved in the garlic oil at the following compounding ratio. Into a nozzle-carrying pressure resisting container (250 ml), 100 g of the resultant product was filled with a nitrogen gas at a filling pressure of 900 kPa (25° C.)

| | |
|---|---|
| Garlic oil | 98.2 parts |
| Monoglycerin fatty acid ester | 1.8 parts |

After being filled, it was kept at room temperature or at a refrigerating temperature. After the container was then shaken 3 to 5 times, the resultant content was discharged from the nozzle. As a result, the resultant content was extended with foaming to be made into a mousse-type food having suitable form-maintaining characteristics as well as mouth-feel of such a food, and the flavor was excellent.

EXAMPLE 9

(Edible Oil) Example Using a Nitrous Oxide Gas

An extra virgin olive oil was heated to 70° C., and monoglycerin fatty acid ester was added to and dissolved in the oil at the following compounding ratio. Into a nozzle-carrying pressure resisting container (90 ml), 50 g of the resultant product was filled with a nitrous oxide gas at a filling pressure of 500 kPa (25° C.).

| | |
|---|---|
| Extra virgin olive oil | 97.5 parts |
| Monoglycerin fatty acid ester | 2.5 parts |

After being filled, it was kept at room temperature or at a refrigerating temperature. After the container was then shaken 3 to 5 times, the resultant content was discharged from the nozzle. As a result, the resultant content was extended with foaming to be made into a mousse-type food having suitable form-maintaining characteristics as well as mouth-feel of such a food, and the flavor was excellent.

EXAMPLE 10

(Edible Oil) Example Using a Mixed Gas of a Carbon Dioxide Gas and a Nitrogen Gas A hot sesame oil was heated to 70° C., and monoglycerin fatty acid ester was added to and dissolved in the oil at the following compounding ratio.

| | |
|---|---|
| Hot sesame oil | 98.0 parts |
| Monoglycerin fatty acid ester | 2.0 parts |

A gas obtained by mixing 3 parts by volume of carbon oxide gas and 7 parts by volume of nitrogen gas was filled with 80 g of the prepared oil into a nozzle-carrying pressure resisting container (250 ml) at a filling pressure of 500 kPa (25° C.). After being filled, it was kept at room temperature or at a refrigerating temperature. After the container was then shaken 3 to 5 times, the resultant content was discharged from the nozzle. As a result, the resultant content was extended with foaming to be made into a mousse-type food having suitable form-maintaining characteristics as well as mouth-feel of such a food, and the flavor was excellent.

EXAMPLE 11

(Edible Oil) Example Using Edible Salt Added as a Seasoning)

A canola oil and a butter oil were mixed with each other, and the mixture was heated to 70° C. Monoglycerin fatty acid ester was added to and dissolved in the resultant mixture. This mixture was agitated and dispersed in a homomixer (Polytron PT-3100 manufactured by the Central Science Co., Ltd.), which was rotated at 4,000 rpm, as edible salt pulverized in advance with mortar was added to the mixture. A spice and β carotene were added to the mixture, and the resultant mixture was thermally sterilized at 95° C. for 1 minute. The oil prepared was then cooled to 25° C. Subsequently, 100 g of the oil prepared was filled with nitrous oxide into a nozzle-carrying pressure resisting container (250 ml) at a filling pressure of 500 kPa (25° C.).

| | |
|---|---|
| Canola oil | 65 parts |
| Butter oil (melting point of 15° C.) | 29.6 parts |
| Monoglycerin fatty acid ester | 3.0 parts |
| Spice | 0.9 parts |
| β carotene (30%) | 0.0008 parts |
| Edible salt | 1.5 parts |

After being filled, the oil was kept at room temperature or at a refrigerating temperature. The container was then shaken 3 to 5 times, and the resultant content was discharged from the nozzle. As a result, the resultant content was extended with foaming to be applied in a suitable quantity to the surface of bread, and showed the property thereof similar to that of the fat spread having a suitable shape-retaining property. This spread-like food had a suitable salty taste and an excellent flavor. After one month from the time of refrigeration, the discharged content was taken out by shaking the container. The properties of the discharged content were unchanged and that the discharged content could be applied in the same manner as that which is soon after being manufactured.

EXAMPLE 12

(Edible Oil) Example in which an Emulsifier is Combined with the Oil

An onion oil was heated to 70° C., and monoglycerin fatty acid ester and poglycerin fatty acid ester were added to and dissolved in the resultant onion oil. The mixture was then agitated and dispersed by rotating a homomixer (Polytron PT-3100 manufactured by CENTRAL KAGAKU CORP.) at 4,000 rpm as an edible salt pulverized by milk bodies in advance was added thereto. The resultant mixture was then cooled to 25° C.

| | |
|---|---|
| Seasoning onion oil (#30RS: manufactured by OHTA OIL MILL CO., LTD.) | 95.9 parts |
| Monoglycerin fatty acid ester | 1.2 parts |
| Polyglycerin fatty acid ester | 0.6 parts |
| Edible salt | 2.3 parts |

After 100 g of the oil prepared was placed in a stainless steel pressure resisting sealed container (40 mm in diameter× 200 mm in length) provided with a valve at a bottom portion thereof, nitrous oxide was introduced from a hole provided at an upper portion of the container thereinto. The valve at the bottom portion of the container was opened with a gas pressure of 1 MPa (25° C.) kept as it was, and the content was taken out through a stainless steel pipe (8 mm in diameter× 150 mm in length) and a vinyl tube (8 mm in diameter×200 mm in length). As a result, the food was extended with foaming, and had an excellent mousse form.

The invention claimed is:

1. A foamable water-in-oil type emulsion in combination with an aerosol container, wherein the emulsion comprises an emulsifier in the amount of 0.5 to 6.0 wt% based on the emulsion; wherein the water-in-oil emulsion in the container prior to jetting is a liquid or gel; wherein the oil in the water-in-oil type emulsion is an edible oil which has a cloud point (ASTM) of about 4.4° C. (40° F.) or lower, the container comprises a gas propellant partially dissolved in said water-in-oil emulsion; the container has a discharging nozzle for discharging the emulsion with the gas propellant as a mousse form therefrom; the mousse is formed at the time of jetting; and wherein the emulsifier consists of at least one member selected from the group consisting of monoglycerin fatty acid ester, sucrose fatty acid ester, sorbitan fatty acid ester, and polysorbate, and wherein the monoglycerin fatty acid ester, if included, is in the range 2.5-3.0 parts by weight based on the emulsion.

2. The foamable water-in-oil-type emulsion according to claim 1, wherein the mousse is a spread.

* * * * *